June 27, 1972 — K. G. HAGEN — 3,672,750
UNDERWATER DIVING MASK
Filed July 31, 1970 — 3 Sheets-Sheet 1

INVENTOR:
KENNETH G. HAGEN,
BY
ATTORNEY

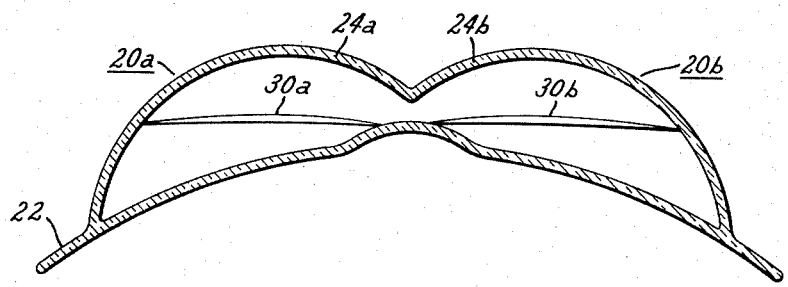
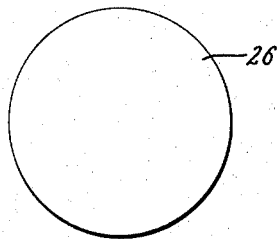
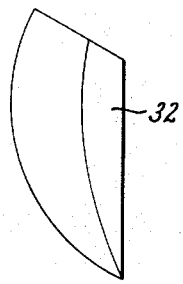
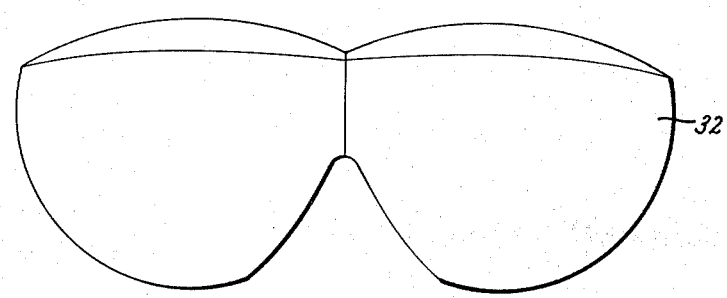
INVENTOR:
KENNETH G. HAGEN,
BY
ATTORNEY June 27, 1972  K. G. HAGEN  3,672,750

UNDERWATER DIVING MASK

Filed July 31, 1970  3 Sheets-Sheet 3

INVENTOR:
KENNETH G. HAGEN
BY William G. Becker
ATTORNEY

United States Patent Office 3,672,750
Patented June 27, 1972

3,672,750
UNDERWATER DIVING MASK
Kenneth G. Hagen, Devon, Pa., assignor to
General Electric Company
Filed July 31, 1970, Ser. No. 59,917
Int. Cl. G02c 1/00
U.S. Cl. 351—43
12 Claims

ABSTRACT OF THE DISCLOSURE

An underwater diving mask including a generally spherical lens portion for each eye with a corrective lens being incorporated into each lens portion to provide in-focus underwater vision for persons having normal, far-sighted or near-sighted vision. The mask allows an underwater diver to have vision substantially comparable to that which he would have in an air environment.

BACKGROUND OF THE INVENTION

Underwater swimmer masks usually include a flat viewing lens mounted in a rubber mask which serves to seal a volume of air in the space between a diver's eyes and lens to allow the eyes to operate in a normal air atmosphere. If any water is caught in the mask, the user can exhale through his nose to clear the mask. The amount of air required to do this clearing is a function of the volume in the mask, the smaller this volume, the easier it is to clear it. Usually a planar transparent lens is used in a diving mask because it is easy and cheap to produce and because previous masks using curved lenses have tended to produce distortion which may cause nausea and is dangerous to the diver. However, planar lens masks have many disadvantages. First, the field of view and peripheral vision are generally quite restricted. Attempts have been made to minimize this by using larger lenses, side auxiliary lenses or angled planar lenses. These attempts do not completely correct the problem and always add to the volume of air in the mask thereby presenting mask clearing problems. An additional problem inherent in the use of planar lenses is the optical effect. Due to the difference in indices of refraction of water and air, the planar lens produces a virtual image of the object viewed which is 25% closer to the viewer than the object, thereby giving an apparent angular magnification effect of 33%. A loss of visual acuity is thereby produced which cannot be fully overcome even by divers accustomed to working under water. Additionally, divers who have far-sighted or near-sighted vision must have expensive prescription ground lenses substituted for the normal mask lens to give them in-focus vision comparable to that which a normal-sighted diver would have using the mask.

SUMMARY OF THE INVENTION

Thus it is an object of the present invention to provide an underwater diving mask which permits the diver to have visual acuity underwater approximating that which he would have in a normal air environment.

A further object of the subject invention is to provide an underwater diving mask allowing a virtually unlimited field of view and peripheral vision.

Another object of the subject invention is to provide an underwater diving mask enclosing a small volume of air to permit easy clearing of the mask.

A still further object is to provide an underwater mask permitting divers who have far-sighted or near-sighted vision as well as those with normal vision to have clearly focused vision underwater.

To fulfill the above-stated objects, the subject invention provides an underwater diver's mask with a lens system including a generally spherical portion for each eye; the center of spherical curvature of the outer surface of each of the lens portions lying approximately within the eye of the user. In a preferred embodiment a generally spherical corrective lens is incorporated in each of the lens portions, with the inner surface of each corrective lens having a radius of spherical curvature larger than the radius of curvature of the outer surface of the lens portion. The subject matter which is regarded as the subject invention is particularly pointed out and distinctly claimed in the concluding portion of the specification.

BRIEF DESCRIPTION OF THE DRAWING

The present invention, however, together with further objects and advantages thereof, may best be understood by reference to the following description taken in connection with the accompanying drawings in which:

FIG. 4 is a top-sectional view of another embodiment of lens system in accordance with the subject invention;

FIGS. 5a and 5b are side and front views, respectively, of a corrective lens for use in the lens systems of FIGS. 1-3;

FIGS. 6a and 6b are side and front views, respectively, of partially cut-off corrective lenses for use in the lens system of the subject invention.

DESCRIPTION OF THE PREFERRED EMBODIMENTS

Figure 1:
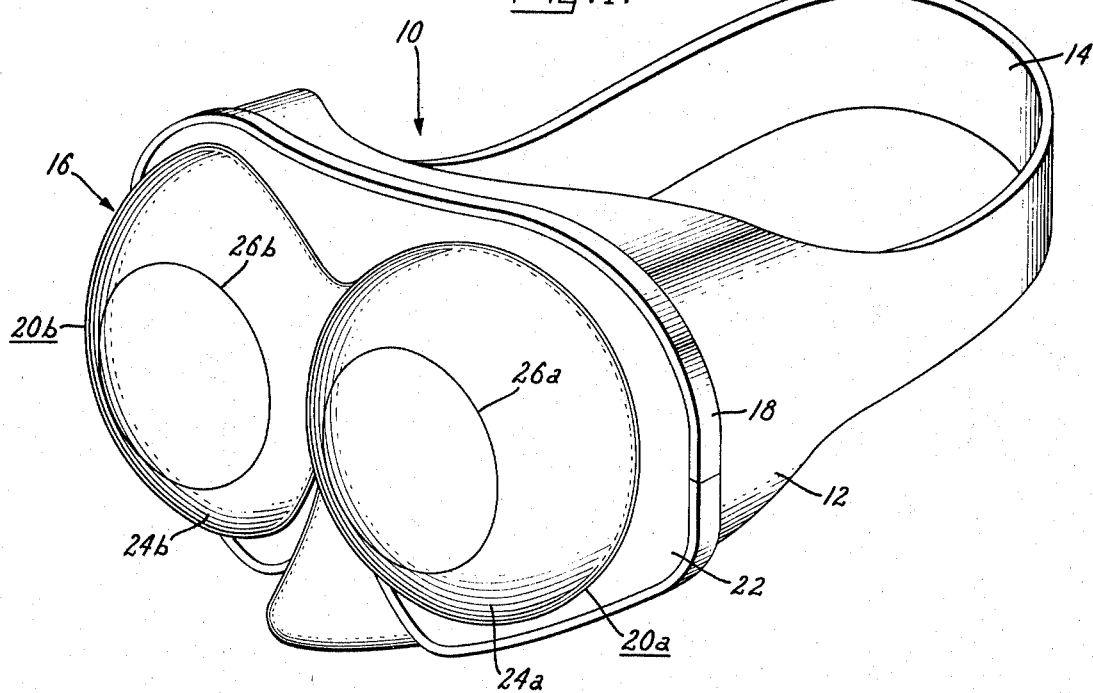
FIG. 1 is a perspective view of a preferred embodiment of an underwater diver's mask including the subject invention.

In accordance with the subject invention, a preferred embodiment of an underwater diving mask 10 is shown in FIG. 1. The mask allows a user to have a very wide field of view and practically unlimited peripheral vision while providing in-focus vision of objects viewed underwater through the mask at little or no magnification of the image of the object.

The mask is comprised of a resilient body 12 formed of a material such as rubber or neoprene, with an attached support strap 14, a lens system 16 and a clamping ring 18 for attaching lens system 16 to mask body 12. The mask body, support strap and clamping ring are all of conventional design. The novelty of the subject invention lies entirely in lens system 16. Any conventional mask design which can accept or could be adapted to accept the lens system of the subject invention could be used.

For purposes of this specification and claims, diving mask is hereby defined to include any eye covering for an underwater diver which contains a volume of air between the diver's eyes and the lens system of the mask. This would include a mask which covers the eyes and nose of the diver, one which merely covers the eyes, and would also include a diver's helmet in which the entire face of the diver is in an air environment.

Figure 2:
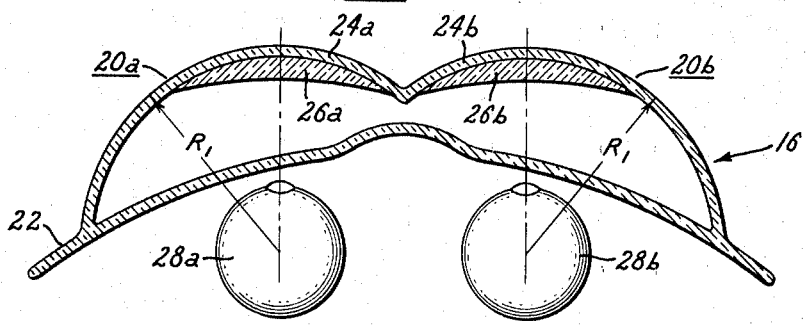
FIG. 2 is a top-sectional view of the lens system of the underwater diving mask shown in FIG. 1 which particularly shows the relationship of the lens system to the eyes of a user.
Figure 3:
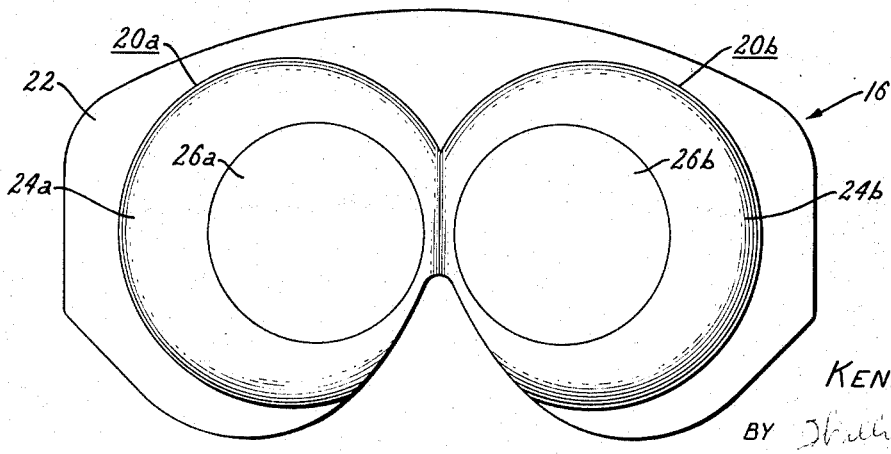
FIG. 3 is a front view of the lens system shown in FIG. 2; viewed from the interior of the mask.

Lens system 16, which is shown in greater detail in FIGS. 2 and 3, is comprised of generally spherical lens portions 20a, 20b for the left and right eye of the user, respectively, and an integral support flange 22 which is to be engaged by clamp 18 to attach lens system 16 to mask body 12. The lens portions are preferably joined together, as shown, to promote ease and economy in manufacture of the lenses and the mask itself.

Each lens portion is comprised of an outer spherical lens 24a, b of substantially constant thickness and an inner, corrective lens 26a, b having spherical surfaces. The preferred range of radius of curvature, $R_1$, of the outer surface of each outer lens is from 1.25 to 2 inches. For radii of curvature significantly outside this range practical adaptation to the human face becomes difficult. It is desirable that the center of curvature of the outer surface of each outer lens lie approximately within the eye 28a, b of the user. No distortion will occur if viewing occurs approximately along a radius of curvature of the lens. Each corrective lens 26a, b has a radius of curvature of its inside surface greater than $R_1$. In the embodiment shown in FIGS. 1–3, the radius of curvature of the outer surface of each corrective lens 26a, b is the same as the radius of curvature of the inner surface of each outer lens 24a, b so that proper mating can occur. Alternatively, the corrective lens can be formed as an integral part of the spherical element. The lens system is formed of an optically transparent material such as glass, plexiglass or other plastic materials.

In the past, curved diving mask lenses have been tried primarily to maximize the field of view and peripheral vision. However, these curved lenses have had a tendency to produce distortion and out-of-focus images for most users resulting in eye strain, poor visual acuity and vertigo.

Assuming a diving mask includes a curved lens with its concave side toward the eyes of the user and air is trapped between the lens and the eyes, the user sees an apparently magnified image if the lens of the eye is between the center of the curvature of the mask lens and the surface of the mask lens, and an apparently diminished image if the lens of the eye is further away than the center of the curvature, assuming the viewing is along a radius of curvature. However, in most prior art mask lenses, the viewing of each eye is not along a radius of curvature, thereby tending to make one portion of the image have a different degree of magnification than other portions of the image. This results in distortion. Where a singly curved mask lens is used, the smaller the radius of curvature of the lens, the more distortion is produced due to the fact that the eyes of the user are located a significant distance apart, on the average about 2½ inches. This distortion producing effect is eliminated by providing separate lens portions 20 for each eye in accordance with the subject invention.

From a practical standpoint, it is obvious that it is desirable to have a mask as small as possible and to have the volume of air within the lens minimized to promote ease in clearing the mask. Further, the lens radius must not be so large that the eyes will see through the adjacent lens at extreme lateral viewing portions of the eyeball. This dictates an approximate maximum radius of curvature for the outer surface of the outer lens portion of two inches. Also, since the smaller the radius of curvature of the lens, the closer to the user the image formed by the lens will be, a very small radius lens will produce images too close for the user to focus and too close to allow the use of a practical corrective lens. This dictates a minimum radius of curvature of approximately 1.25 inches.

The theoretical basis for this is shown in the following example considering a basic hemispherical lens and paraxial light rays in which case Snell's Law of Refraction becomes:

$$\frac{n}{s} + \frac{n'}{s'} = \frac{n'-n}{R}$$

where $n$ = the index of refraction of the medium in which the object is located;
$n'$ = the index of refraction of the lens;
$s$ = the distance of the object from the outer surface of the lens;
$s'$ = the location of the image formed from the outer surface of the lens; and
$R$ = the radius of curvature of the lens.

Taking an example where $n = 1.333$, the index of refraction of water; $n' = 1.5$, the index of refraction of the plexiglass; $s = 120$ inches, the object distance and $R = 1.75$ inches, a radius of curvature within the range specified, the solution for $s'$ is $+17.8$ inches; i.e., the image is formed 17.8 inches from the lens outer surface on the opposite side relative to the object. The above equation is then solved for this image using the inside surface of the lens in which $s$, the object distance, is now $-17.7$ inches (compensating for the .1 inch thickness of the lens), $n$ is now equal to 1.5 (for the plexiglass), $n'$ equals 1 (for air) and $R$ equals 1.65 (compensating for the .1 inch thickness of the lens). This results in a value for $s'$ of $-4.6$ inches, i.e., the image seen by the user is 4.6 inches from the inside surface of the lens toward the object. This image distance is too close to be in focus for all but the most near-sighted users.

To make the image distance a more comfortable distance away from the user's eyes, a corrective lens is utilized. Using standard lens makers' equations it has been found that for a 2–3 inch circular diameter corrective lens positioned as shown in FIGS. 1–3 the radius of curvature of the inside surface is preferably between 2½ and 3½ inches. By proper selection of the radius, the lens system will satisfy the vision requirements of near-sighted and far-sighted people in addition to people with normal vision. The larger the radius of curvature, the farther the image distance will be, thus making it better suited for a far-sighted person. Correspondingly, the smaller the radius of curvature, the closer the image will be, thus making the lens system better suited for a near-sighted person. It is preferable that each corrective lense be generally perpendicular to the straight forward line of vision of the user.

As shown in FIG. 4, the corrective lenses need not be in contact with the inner surface of the outer lens, but rather corrective lenses 30a, 30b can be mounted a fixed distance away from the inner surface of outer lens 24a, 24b. Of course, to provide the proper correction, the second embodiment of corrective lenses must have different radii of curvature than that specified for the first embodiment. Corrective lenses 30a, 30b can be attached to the inner surface of lens 24a where the outer edge contacts lens 24a, 24b, or, if desired, a separate set of spectacles can be employed by the user to provide the needed correction. Of course, one obvious advantage of the preferred embodiment, as shown in FIGS. 1–3, over the embodiment shown in FIG. 4 is that corrective lenses 26a and 26b can either be molded integrally into the lens systems or be easily attached to outer lens 24a, 24b by any well known fastening technique for optical lenses, such as using an appropriate cement.

FIGS. 5a, b show two views of a corrective lens 26 which may be utilized to provide the lens system shown in FIGS. 1–3.

FIGS. 6a, b show a preferred embodiment of corrective lens in which spherical corrective lenses are joined together and have their top portion cut off. The reason for joining the two corrective lenses together is for ease and economy in manufacture of the lenses. Because a user in viewing through the corrective lens would find a degradation of visual acuity if the mask were used above the water, the top portion of corrective lenses 32 has been cut off to provide a bifocal effect, allowing the user to look directly through the outer lens 24a, b when he is above the surface of the water to provide normal visability above the water.

Figure 7:
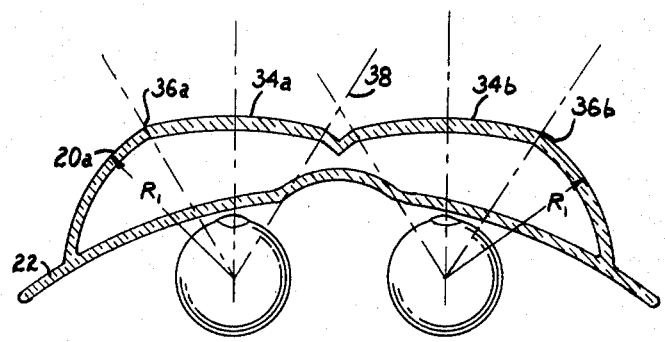
FIG. 7 is a top-sectional view of yet another embodiment of lens system, in accordance with the subject invention.

In the case where the corrective lenses are molded integrally, the central region of each lens portion, including the corrective lens, can take alternative, optically equivalent geometries. In the embodiment shown in FIG. 7, the central portion of outer lens 24a, b is eliminated and a corrective lens 34a, b, optically equivalent to the central portion of the outer lens and the corrective lens 26a, b combined, is incorporated in each lens portion 20a, b. The optically equivalent corrective lens 34a, b is determined by selecting a radius larger than $R_1$ for its outer surface. The inner radius of each corrective lens 34a, b is preferably equal to or larger than the outer radius of lens 34a, b to yield the desired visual focusing range of the lens system. In doing this it is important to retain the generally spherical shape of the outer lenses 24a, b in order to avoid distortion as discussed above. Further, the juncture 36 between each corrective lens and outer lens is abrupt, i.e. no blending, to avoid a ring of distortion, as is done in bifocal spectacles. This is accomplished by permitting the two spherical surfaces 24a, b and 34a, b to intersect along the surface of an imaginary right circular cone 38 having the apex approximately at the center of the eye.

Thus, in accordance with the subject invention, a lens system is provided for a diving mask which affords an underwater diver visual acuity approximating that which he would normally have in an air environment. This lens system also provides images underwater which lie within the far point of most near-sighted people and beyond the near point of most far-sighted people. By this arrangement, the need for prescription ground lenses in diving masks is minimized. Further, by selecting a small number of specific geometries, the whole range of human eye defects can be adequately accommodated by the user's selection of one of them.

It is obvious that many variations to the above-disclosed lens system can be made within the scope of the subject invention. Therefore, it is intended that the scope of the present invention be limited only by the appended claims.

What I claim as new and desire to secure by Letters Patent of the United States is:

1. In an underwater diving mask comprised of a lens system and a structure for supporting said lens system, the improvement comprising:

said lens system being comprised of a lens portion for each eye;

each of said lens portions incorporating a generally spherical outer lens of substantially constant thickness, the center of curvature of the outer surface of each of said outer lenses lying approximately at the center of the respective eyeball of the user, and a corrective lens, the inner surface of said corrective lens having a radius of spherical curvature larger than the radius of curvature of the outer surface of said outer lens.

2. A diving mask as in claim 1 wherein the radius of curvature of the outer surface of each of said outer lenses is from 1.25–2.0 inches.

3. A diving mask as in claim 1 wherein said lens portions are joined together to form a one-piece lens system.

4. A diving mask as in claim 1 wherein each of said corrective lenses is of a generally circular shape.

5. A diving mask as in claim 4 where each of said corrective lenses has its upper portion cut away.

6. A diving mask as in claim 1 wherein each of the said corrective lenses is an integral part of said lens portions.

7. A diving mask as in claim 1 wherein each of said corrective lenses is attached to the inner surface of said outer lens.

8. A diving mask as in claim 1 wherein the circular diameter of each of said corrective lenses is approximately 2–3 inches and the radius of curvature of the inside surface of each said corrective lenses is from 2½–3½ inches.

9. A diving mask as in claim 1 wherein each of said corrective lenses is displaced a fixed distance from the inner surface of the outer lens.

10. A diving mask as in claim 1 wherein each of said corrective lenses is substantially perpendicular to a line of vision straight forward from the eyes of the user.

11. A diving mask as in claim 1 wherein each of said corrective lenses forms the central region of its respective lens portion and the radius of curvature of the outer surface of each of said corrective lenses is greater than the radius of curvature of the outer surface of said outer lens.

12. A diving mask as in claim 11 wherein there is an abrupt juncture between each of said corrective lenses and said outer lenses.

References Cited

UNITED STATES PATENTS

| | | | |
|---|---|---|---|
| 3,320,018 | 5/1967 | Pepke | 351—43 UX |
| 3,051,957 | 9/1962 | Chan | 351—43 X |
| 2,928,097 | 3/1960 | Neufeld | 351—43 X |

FOREIGN PATENTS

| | | | |
|---|---|---|---|
| 861,573 | 1/1953 | Germany | 351—43 |
| 1,374,010 | 8/1964 | France | 351—43 |

OTHER REFERENCES

Gregg, 52 Optometric Weekly 1381–1385, 1388 (July 1961).

JOHN K. CORBIN, Primary Examiner

R. L. SHERMAN, Assistant Examiner

U.S. Cl. X.R.

2—14